United States Patent Office 3,187,598
Patented June 8, 1965

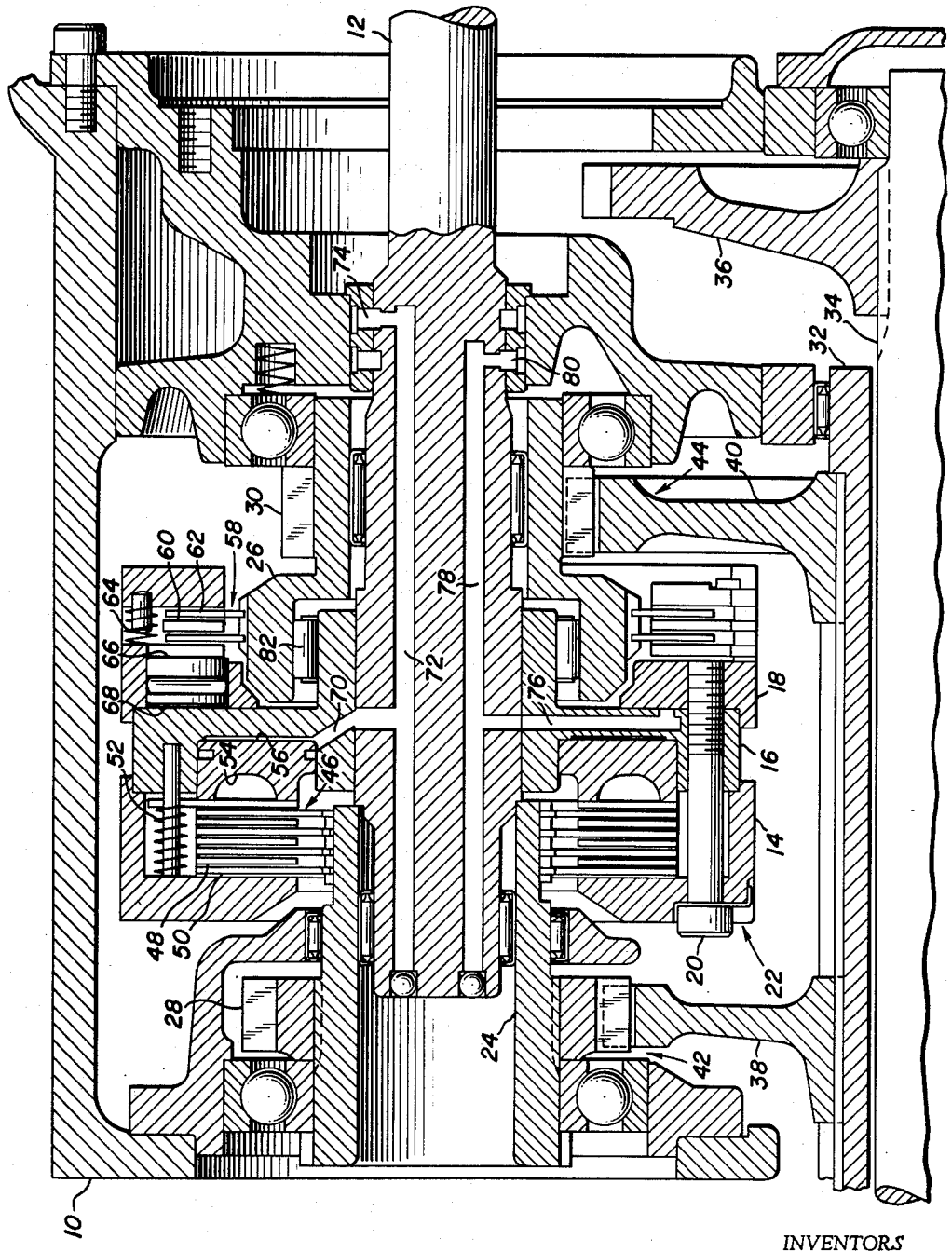

3,187,598
TORQUE AMPLIFICATION
Richard G. Hennessey, Oak Lawn, and Leonard Padleckas, Chicago, Ill., assignors to International Harvester Company, Chicago, Ill., a corporation of New Jersey
Filed Jan. 16, 1963, Ser. No. 251,840
14 Claims. (Cl. 74—368)

This invention relates generally to power transmission. More particularly it relates to a torque amplifier for use in association with a transmission to extend the range thereof by providing for increased torque capacity. In one of its forms the invention may be incorporated in a tractor.

The work capacities required for agricultural, industrial and construction efforts have been increasing for many years. Therefore, modern tractors necessarily have increased speed and load carrying capacities for various types of work operations. To satisfy these needs, speed change transmissions and infinitely variable transmissions are often provided with torque amplifiers for increasing their operational ranges. Certain defects have become apparent in these torque amplifiers, among which is the fact that engine braking is generally not provided for torque amplifier operation, and that a gap in the power transmission is often the result of either up or down shift operations, or both. Furthermore, in the specific class of transmissions operated by hydraulic means, it has often been found that the timing of the application of hydraulic pressure to the various systems is critical. It is for the purpose of alleviating these deficiencies, among others, that applicants' improved torque amplifier has been developed.

An object of this invention is to provide a torque amplifier which will allow engine braking during torque amplifier operation.

Another object of this invention is to provide a torque amplifier which will allow smooth transition during up and/or down shifting without an apparent gap in power transmission.

Another object of this invention is to provide a torque amplifier in which there is no blocking of the application of one coupling means by other coupling means.

Another object of this invention is to provide a hydraulically actuated torque amplifier in which the hydraulic valve timing is not critical and in which no overlap of hydraulic pressure is necessary for the operation of the various coupling means.

Another object of this invention is to provide a torque amplifier including a first hydraulically actuated clutch for a first drive and an overrunning clutch for a second drive, as well as a second hydraulically actuated clutch-brake mechanism for reducing the time of transition from the first to the second drive.

These and other objects of this invention will become apparent to one skilled in the art upon a perusal of this application in conjunction with the drawing, in which the torque amplifier is illustrated in section.

Turning now more particularly to the drawing, it will be seen that the housing 10 generally serves to support the entire torque amplifier assembly. Rotatably mounted within housing 10 is a power input shaft 12. Although in the preferred form of this invention, power input shaft 12 is coupled to the engine output shaft (not shown), it is to be understood that the torque amplifier may be incorporated at other points in a power train, such as, for example, between the transmission and differential. Securely splined to power input shaft 12 are sub-housing elements 14, 16 and 18, which are joined releasably by a plurality of bolts 20 to form a carrier 22. Mounted for rotation relative to power input shaft 12, on one or more bearings each, are annular idler shafts 24 and 26. Drive pinion gear 28 and torque amplifier pinion gear 30 are securely splined to idler shafts 24 and 26, respectively, for rotation therewith.

Also mounted rotatably within housing 10 is a power output shaft 32, which in a preferred form of the invention is coupled to a transmission input shaft (not shown), and which takes the form of an annular shaft about a power take-off shaft 34. Gearing means 36 may be connected through suitable clutching means (not shown) with the engine to provide independent power for driving auxiliary equipment.

Drive gear 38 and torque amplifier gear 40 are securely splined to power output shaft 32 for rotation therewith. Drive pinion gear 28 and drive gear 38 mesh to form drive gear set 42. Similarly, torque amplifier pinion gear 30 and torque amplifier gear 40 mesh to form torque amplifier gear set 44. Drive gear set 42 is constructed and arranged to provide a relatively high speed-low torque ratio. Torque amplifier gear set 44 is constructed and arranged to provide a relatively low speed-high torque ratio.

A relatively heavy, friction clutch 46, which in a preferred form of the invention comprises a four-plate unit, includes a plurality of friction disks 48 mounted on sub-housing element 14 of carrier 22 for rotation therewith. A plurality of complementary friction disks 50 is mounted on idler shaft 24 for rotation therewith. Suitable spring means 52 is provided for biasing friction disks 48 and 50 out of contact; that is, it serves to bias clutch 46 toward its disengaged position. Slidably received within sub-housing element 14 of carrier 22 for rotation therewith. tween piston 54 and sub-housing element 16 is formed a chamber 56.

A relatively light, friction lockup clutch 58, which in a preferred form of the invention comprises a two-plate unit, includes a plurality of friction disks 60 which are suitably secured to sub-housing element 18 of carrier 22 for rotation therewith. Similarly, a plurality of complementary friction disks 62 is secured to idler shaft 26 for rotation therewith. Spring means 64 is provided for biasing friction disks 60 and 62 out of contact; that is, to bias lockup clutch 58 toward its disengaged position. The relatively light nature of lockup clutch 58 serves to provide a combination action as will be brought forth in more detail below. Slidably received within sub-housing element 18 of carrier 22 is a clutch actuating piston 66. Between piston 66 and sub-housing element 16 is formed a chamber 68.

A fluid passage 70 within sub-housing element 16 communicates chamber 56 with a fluid passage 72 formed within power input shaft 12. Fluid passage 72 communicates through a controlled fluid flow passage 74 with suitable actuating mechanism (not shown). Similarly, a fluid passage 76 within sub-housing element 16 communicates with a fluid passage 78 within power input shaft 12. Fluid passage 78 communicates through a controlled fluid flow passage 80 with the actuating mechanism.

An overrunning clutch 82 is mounted between sub-housing element 16 and idler shaft 26. Overrunning clutch 82 serves to engage sub-housing element 16 with idler shaft 26 upon the obtainment of synchronous speed by power input shaft 12 and torque amplifier pinion gear 30.

During normal operation, friction clutch 46 is engaged and lockup clutch 58 is disengaged. Power is transmitted from power input shaft 12 through carrier 22, friction clutch 46, idler shaft 24, and drive gear set 42 to power output shaft 32, from whence it is directed to the transmission. Torque amplifier gear set 44 is driven by output shaft 32, causing torque amplifier pinion gear 30 and idler shaft 26 to rotate at a greater speed than that of power input shaft 12 and sub-housing element 16. Consequently, overrunning clutch 82 is disengaged.

When it is desired to actuate the torque amplifier, fluid is released from chamber 56 and directed into chamber 68. Under the action of spring means 52, friction clutch 46 is disengaged; while against the action of spring means 64, lockup clutch 58 is engaged by fluid pressure in chamber 68. Because of the relatively light nature of lockup clutch 58, during initial contact of friction disks 60 and 62 torque amplifier pinion gear 30 and idler shaft 26 decelerate quickly to a point at which the speed of rotation thereof is synchronized with the speed of rotation of power input shaft 12 and sub-housing element 16, at which time overrunning clutch 82 engages. Power is then directed from power input shaft 12 through sub-housing element 16, overrunning clutch 82, idler shaft 26, and torque amplifier gear set 44 to output shaft 32, from whence it is directed to the transmission. Thus it will be seen that during light load or no load operation, or when traveling down an incline, the deceleration period of torque amplifier pinion gear 30 and idler shaft 26, which would have been delayed for an undesirable period of time due to free-wheeling, is shortened to eliminate noticeable gaps in power transmission. This sequence of operation results in a smooth, positive down shift. Operation under heavy load is not affected, as in this condition overrunning clutch 82 would engage prior to or simultaneously with engagement of the lockup clutch 58.

It should be apparent that lockup clutch 58 provides engine braking for retarding the relative rotation between torque amplifier pinion gear 30 and power input shaft 12, thus in effect controlling undesirable free wheeling. After initial contact between friction disks 60 and 62, lockup clutch 58 engages in parallel with overrunning clutch 82. Timing of the application of fluid to actuate lockup clutch 58 is not critical with respect to the timing of the release of fluid from its actuating condition with regard to friction clutch 46. No overlapping of fluid application is necessary and hence one clutch does not fight the other.

When it is desired to return to normal operation, fluid is released from chamber 68 and applied to chamber 56. Actuation of friction clutch 46 engages power input shaft 12 with drive pinion gear 28. Torque amplifier pinion gear 30 overruns power input shaft 12 and overrunning clutch 82 disengages. Lockup clutch 58 disengages under the influence of spring means 64, resulting in a smooth up shift.

Thus, it will be seen that applicants' invention provides a smooth shift in power transmission as well as for engine braking during initial torque amplifier operation. Furthermore, it provides for the actuation of a plurality of clutches in a manner in which timing of fluid application is not critical.

The terms used in the foregoing description are general in nature and serve to define one preferred form of applicants' invention. Although the torque amplifier in its preferred form is situated between the engine output shaft and the transmission input shaft, its use in other positions in a power train is contemplated. It is to be understood that various embodiments and modifications of the invention may be made without departing from the spirit and scope thereof.

We claim:

1. In a torque amplifier, the combination comprising power input means, power output means, a plurality of power transfer means having different torque ratios, first coupling means for interconnecting said input means with said output means through one of said transfer means for transferring power between said input and output means at one torque ratio, second coupling means for interconnecting said input means with said output means through another of said transfer means for transferring power between said input and output means at another torque ratio, and third coupling means for interconnecting said input and output means through said other transfer means in parallel with said second coupling means.

2. The invention according to claim 1, wherein each of said input and output means comprises a shaft, each of said transfer means comprises a gear set, and each of said coupling means comprises a clutch.

3. The invention according to claim 2, wherein said second coupling means comprises an overrunning clutch.

4. The invention according to claim 3, wherein said first coupling means comprises a relatively heavy clutch and said third coupling means comprises a relatively light clutch.

5. The combination comprising first and second rotatable shafts, first and second gears engageable with one of said shafts for rotation therewith, third and fourth gears in meshing engagement with said first and second gears respectively and mounted for rotation with the other of said shafts, friction clutch means for engaging said one shaft with said first gear, overrunning clutch means for engaging said one shaft with said second gear, and means engageable with said one shaft and said second gear for retarding relative rotation therebetween.

6. The invention according to claim 5, wherein said first and third gears comprise a relatively high speed-low torque gear set and said second and fourth gears comprise a relatively low speed-high torque gear set.

7. The invention according to claim 5, wherein said retarding means comprises lockup clutch means for engaging said one shaft with said second gear.

8. The invention according to claim 7, wherein said friction clutch means is relatively heavy and said lockup clutch means is relatively light.

9. The invention according to claim 7, wherein said friction clutch and lockup clutch means are fluid actuated.

10. The invention according to claim 7, further comprising a carrier mounted for rotation with said one shaft, said friction clutch means, overrunning clutch means and lockup clutch means being supported by said carrier.

11. The invention according to claim 10, wherein said one shaft is a power input shaft and said other shaft is a power output shaft.

12. The combination comprising first and second rotatable shafts, a relatively high-speed low-torque gear set engaging one of said shafts and engageable with the other of said shafts, a relatively low-speed high-torque gear set engaging one of said shafts and engageable with the other of said shafts, first clutch means for engaging one of said gear sets with the shaft with which it is engageable, second clutch means for engaging the other of said gear sets with the shafts with which it is engageable, and overrunning clutch means for engaging the other of said gear sets with the shaft with which it is engageable in parallel with said second clutch means.

13. The invention according to claim 12, wherein at least one of said gear sets is engaging said second shaft and is engageable with said first shaft.

14. The invention according to claim 13, wherein said first shaft is a power input shaft and said second shaft is a power output shaft.

References Cited by the Examiner

UNITED STATES PATENTS 2,792,714  5/57  Forster _____ 74—368

DON A. WAITE, *Primary Examiner.*